Aug. 15, 1967  G. L. GUINOT  3,335,809
PROPULSION SYSTEM FOR EARTH WORKING VEHICLE
Filed Sept. 23, 1965
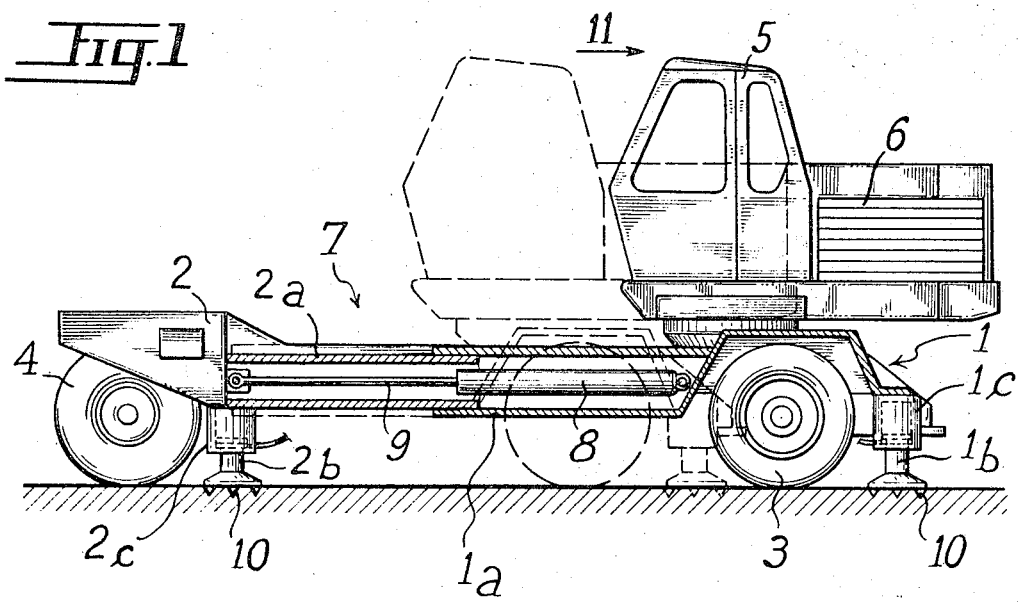
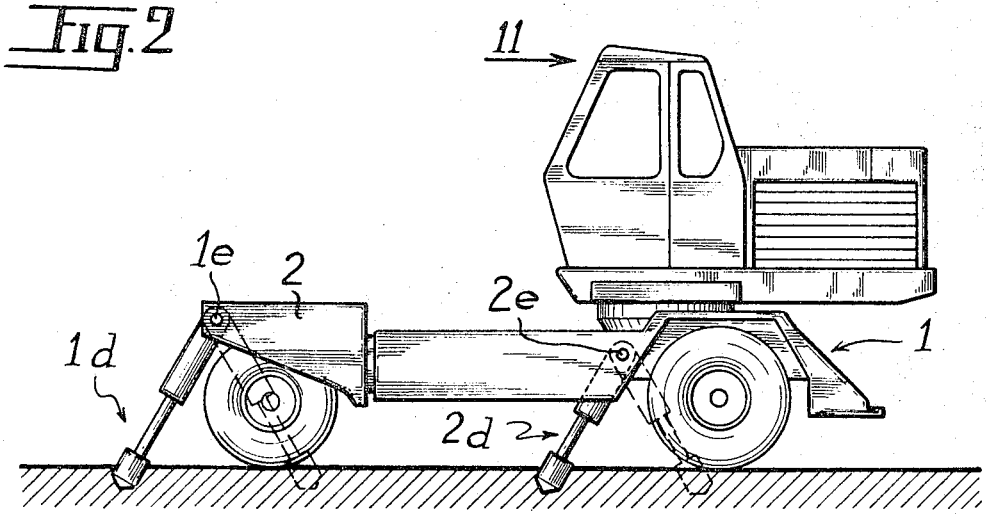
INVENTOR
GABRIEL L. GUINOT
BY
Mason, Fenwick & Lawrence
ATTORNEYS 3,335,809
PROPULSION SYSTEM FOR EARTH
WORKING VEHICLE
Gabriel L. Guinot, Le Plessis-Belleville, France, assignor to Societe Anonyme Poclain, Le Plessis-Belleville (Oise), France
Filed Sept. 23, 1965, Ser. No. 489,703
Claims priority, application France, Sept. 25, 1964, 989,362
2 Claims. (Cl. 180—8)

ABSTRACT OF THE DISCLOSURE

A telescopically extenable vehicle including selectively operable ground engaging anchors mounted on relatively movable vehicle portions and a hydraulic cylinder for moving the vehicle portions with respect to each other.

This invention relates to vehicles and is concerned more particularly with earth working vehicles, such as mechanical excavators, mechanical shovels and the like which frequently have to operate on rough uneven and boggy ground.

With such vehicles difficulty is often experienced in moving the vehicle over the ground when in operation, particularly when operating on boggy or muddy surfaces, and the object of the present invention is to overcome this difficulty.

With this object in view the vehicle according to the invention is provided with a chassis comprising two parts slidable relative to each other, means for effecting relative sliding movement of said two chassis parts, and each of said chassis parts having supporting means, by which the vehicle can be moved over the ground, and anchoring means for anchoring said chassis parts selectively to the ground.

According to another aspect of the invention a wheeled vehicle of the earth working type, such as a mechanical excavator, is provided with a chassis comprising two parts slidable horizontally relative to each other, a double acting ram arranged between the two chassis parts for effecting relative sliding movement of said chassis parts, a pair of wheels mounted on each of said chassis parts, for normal movement of the vehicle over the ground, and anchoring means mounted on each chassis part for anchoring said chassis parts selectively to the ground.

In order that the invention may be more clearly understood two particular embodiments of the invention will now be described, by way of example, with reference to the accompanying diagrammatic drawings in which:

FIGURE 1 is a part sectional side elevation of one embodiment of vehicle according to the invention, and FIGURE 2 is a side elevation of another embodiment of vehicle according to the invention.

Referring to FIGURE 1 of the drawings the vehicle comprises a chassis formed in two parts 1 and 2 mounted on wheels 3 and 4 respectively. On the part 1 of the chassis is mounted a cabin 5 and a power unit 6. The chassis parts 1 and 2 are provided substantially at the level of the platform 7 with members 1a and 2a respectively which are horizontally slidable telescopically one within the other. In order to ensure accurate and easy relative sliding movement, said sliding members 1a and 2a are preferably provided with longitudinal interengaging guiding ribs and grooves. Between the telescopic members 1a and 2a is mounted a double acting hydraulic ram. The ram is mounted within said telescopic members with the cylinder 8 of the ram connected with the part 1 of the chassis and the piston rod 9 of said ram connected with the part 2 of the chassis. The stroke of the hydraulic ram 8, 9 is slightly less than the length of the sliding members 1a or 2a and the operation of said ram is controlled from the cabin 5 in any known manner, for example, by means of a pump driven by the power unit 6.

Each of the parts 1 and 2 of the vehicle chassis is provided with anchoring means respectively for selectively anchoring said chassis parts to the ground. In the embodiment shown in FIGURE 1 each anchoring means comprises an expandable and contractable member in the form of an hydraulic ram, the cylinder 1c, 2c of which is rigidly connected with the chassis part 1 and 2 respectively, whilst the vertically movable piston part 1b, 2b of the ram projects from the cylinder and is provided at its outer free end with an anchoring shoe provided with spikes 10 for increasing the grip of the shoes with the ground. The operation of the rams 1c, 1b and 2c, 2b, constituting the anchoring means, is controlled in any known manner from the cabin 5 of the vehicle.

It will be understood that by forming the vehicle chassis of two longitudinal relatively slidable chassis parts 1 and 2, the overall length of the vehicle can thereby be varied by an amount corresponding to the stroke of the hydraulic ram 8, 9 and by this means relatively small forward or backward movements of the vehicle can be effected when the vehicle cannot be driven by means of its driving wheels, for example due to wheel-slip on boggy or other bad ground surface. Operation of the vehicle in this manner is effected as follows: Assuming the ram 8, 9 is retracted and the wheels 3 and cabin 5 are in the position shown in chain dotted lines, the vehicle is moved in the direction of the arrow 11 by first anchoring the part 2 of the chassis to the ground by the anchoring means 2c, 2b the part 1 of the chassis is then moved forward into the position shown in full lines in FIGURE 1 by expanding the hydraulic ram 8, 9. The part 1 of the chassis is then anchored to the ground by the anchoring means 1c, 1b, the anchoring means 2c, 2b is released and the hydraulic ram 8, 9 retracted to pull the part 2 of the chassis towards the part 1 thereof. This operation is then repeated until the vehicle is moved to the desired location. In order to move the vehicle in the opposite direction the above operation is of course carried out in the reverse order.

In the embodiment of the invention illustrated in FIGURE 2 the vehicle chassis comprises two telescopically slidable parts 1 and 2 as in FIGURE 1 but is provided with a modified form of anchoring means 1d and 2d. The shoe element of this embodiment of anchoring means consists of a pointed or spike element adapted to dig into the ground. These anchoring means are pivoted to each of the chassis parts about horizontal axes 1e and 2e respectively whereby said anchoring means are angularly pivotable in a vertical plane between the positions shown in full lines and chain dotted lines. Means not represented may also be provided to cause spike elements to disappear and move away from the floor when the vehicle uses its wheels for moving. The movement of the vehicle is effected in the same manner as in the embodiment according to FIGURE 1 except that the anchoring means 1d, 2d are swung into the position shown in full lines when it is desired to move the vehicle in the direction of the arrow 11 and into the position shown in chain dotted lines when it is desired to move the vehicle in the opposite direction. It will be understood that when the vehicle is being moved in the direction of the arrow the anchoring means 1d will dig into the ground whilst the anchoring means 2d will trail over the ground.

It must be understood that the invention is not limited to the embodiment herein illustrated and described. For example it is not limited to wheeled vehicles but can be applied equally well to vehicles provided with skids or the like. Furthermore, more than one operating ram 8, 9 may be provided and such rams need not necessarily be of the hydraulic type. The two chassis parts may furthermore be slidable relative to each other by means other than telescopic members sliding one within the other.

I claim:
1. A vehicle having a chassis comprising two parts slidable relative to each other, means for effecting relative sliding movement of said chassis parts, supporting means for each of said chassis parts whereby said vehicle can be moved over the ground, an anchoring means associated with each of said chassis parts comprising a hydraulic ram including a cylinder pivotally connected to its respective chassis parts about a substantially horizontal axis, a piston slidable in said cylinder and projecting therefrom and a pointed anchoring shoe mounted on the outer free end of said piston whereby each of said chassis parts can be selectively anchored to the ground.

2. An earth working vehicle, such as a mechanical excavator, having a chassis composed of two parts slidable relative to each other, at least one double acting hydraulic ram arranged between said chassis parts, a pair of wheels mounted on each of said chassis parts for normal movement of said vehicle over the ground, an anchoring means mounted on each of said chassis parts comprising a hydraulic ram including a cylinder pivotally connected to its respective chassis part about a substantially horizontal axis, a piston slidable in said cylinder and projecting therefrom, and a pointed anchoring shoe mounted on the outer free end of said piston for anchoring said chassis parts selectively to the ground.

References Cited

UNITED STATES PATENTS

| | | | |
|---|---|---|---|
| 1,562,795 | 11/1925 | Sauver | 188—6 |
| 1,662,886 | 3/1928 | Fischer | 188—6 |
| 1,972,702 | 9/1934 | Cohen et al. | 188—6 X |
| 2,049,357 | 7/1936 | Daignault | 188—5 |
| 2,832,610 | 4/1958 | Le Tarte | 280—405 |
| 2,833,531 | 5/1958 | Joy | 180—8 X |
| 2,888,088 | 5/1959 | Claas et al. | 280—34 X |
| 2,996,206 | 8/1961 | McKee | 280—34 X |
| 3,242,896 | 3/1966 | Kauffmann | 280—34 |

FOREIGN PATENTS 563,884    10/1923    France.

LEO FRIAGLIA, *Primary Examiner.*